United States Patent
Deville et al.

[11] Patent Number: 6,094,481
[45] Date of Patent: Jul. 25, 2000

[54] TELEPHONE HAVING AUTOMATIC GAIN CONTROL MEANS

[75] Inventors: Yannick Deville, Villecresnes; Loïc Fleurenceau, Castelnau le Lez; Olivier Rech, Caen; Gilles Audio, Le Mans, all of France

[73] Assignee: U.S. Philips Corporation, New York, N.Y.

[21] Appl. No.: 08/946,780

[22] Filed: Oct. 8, 1997

[30] Foreign Application Priority Data

Oct. 10, 1996 [FR] France .................................. 96 12379

[51] Int. Cl.⁷ .............................. H04M 1/64; H03G 3/00
[52] U.S. Cl. .......................... 379/390; 379/387; 379/389; 381/104; 381/107
[58] Field of Search ..................... 379/390, 387, 379/388, 389, 391, 392, 395; 381/107, 312, 104

[56] References Cited

U.S. PATENT DOCUMENTS

| | | | |
|---|---|---|---|
| 4,747,065 | 5/1988 | West | 708/200 |
| 4,829,565 | 5/1989 | Goldberg | 381/107 |
| 4,847,897 | 7/1989 | Means | 379/390 |
| 4,887,299 | 12/1989 | Cummins et al. | 381/68.4 |
| 5,027,410 | 6/1991 | Williamson et al. | 381/68.4 |
| 5,170,430 | 12/1992 | Schuh | 379/390 |
| 5,267,322 | 11/1993 | Smith et al. | 381/107 |
| 5,369,711 | 11/1994 | Williamson, III | 381/104 |
| 5,485,515 | 1/1996 | Allen et al. | 379/390 |
| 5,515,432 | 5/1996 | Rasmusson | 379/390 |
| 5,524,148 | 6/1996 | Allen et al. | 379/390 |
| 5,526,419 | 6/1996 | Allen et al. | 379/390 |
| 5,553,134 | 9/1996 | Allen et al. | 379/390 |
| 5,559,880 | 9/1996 | Shiono | 379/390 |
| 5,710,820 | 1/1998 | Martin et al. | 381/68.4 |

FOREIGN PATENT DOCUMENTS

0682437A2 11/1995 European Pat. Off. ......... H04M 9/08

*Primary Examiner*—Forester W. Isen
*Assistant Examiner*—Jacques M. Saint-Surin
*Attorney, Agent, or Firm*—Dicran Halajian

[57] ABSTRACT

A telephone is disclosed having an automatic gain control circuit and a processor which separates a local signal into a sound signal and a speech signal. The automatic gain control circuit selects a gain value based on sound levels of the sound signal when the speech signal indicates an absence of speech. The telephone also has a variable gain amplifier to amplify a received signal. The gain of the amplifier is selected from stored gain values which are stored in a memory of the telephone in a table format and are a function of the sound signal and volume levels of the sound signal chosen by a user. An input device of the telephone allows the user to select one of the volume levels.

13 Claims, 5 Drawing Sheets

6,094,481

TELEPHONE HAVING AUTOMATIC GAIN CONTROL MEANS

FIELD OF THE INVENTION

The invention relates to a telephone comprising automatic gain control means for controlling a sound volume as a function of a local ambient noise level, which sound volume is restored on the basis of a signal coming from a called party.

The invention is particularly useful in the case of mobile telephones or cordless telephones which may be used in an environment with much ambient noise for which it has been found useful to adapt the level of the sound restored by the telephone in dependence on the ambient noise level.

BACKGROUND OF THE INVENTION

EP 682 437 is known which relates to an automatic sound volume control device for a telephone. The sound volume is automatically controlled as a function of the ambient noise so as to deliver the sound level that is adapted best to the listening conditions. The telephone detects the presence of words pronounced by the user so as to measure the noise outside these periods of words. The corrections are made with the aid of amplifier means which apply a gain variation law covering the range of the noise level. The apparatus thus described unburdens the user of any work he has to carry out during his telephone communications. This may be insufficient in certain conditions of use. Particularly, a mobile telephone may be used under conditions of diverse and variable noise to which may be added more or less good-quality links with the called party and a dependence on the level at which the called party's voice is received, which level causes a signal of higher or lower amplitude to be received, so that the restored sound signal may become hard to hear by a user. In fact, the intensity of the called party's voice may vary with his/her position relative to the microphone, or with the strength of his/her voice. On the other hand, the auditive faculties of the telephone user vary from one user to the next. All these reasons make that it is desirable to permit the user to react at a sound level that is restored in accordance with his preferences.

SUMMARY OF THE INVENTION

It is an object of the invention to permit a listener to choose an automatic sound volume variation mode that is to his own liking. The telephones being apparatus for the general public, there are to be cost-effective solutions for not increasing the cost of such telephones.

This object is achieved with a telephone which includes means for selectively applying various gain variation laws in dependence on the ambient noise level and this for the same ambient noise level free from the restored sound volume.

The telephone may be adapted to the preferences of each user, or operate totally automatically, under any noise conditions and for various transmission qualities.

Preferably, these additional functions are obtained via software, which modifies the current hardware structure of the telephones very little. The various gain variation laws may be stored in storage means, for example, a memory which may be addressed via keys which cause an incrementation/decrementation of the addresses in the case of an instruction by the user. The additional cost of a telephone having these functions is very little.

These various aspects of the invention and still others will be apparent from and elucidated with reference to embodiments to be described hereafter.

DESCRIPTION OF PREFERRED EMBODIMENTS

Figure 1:
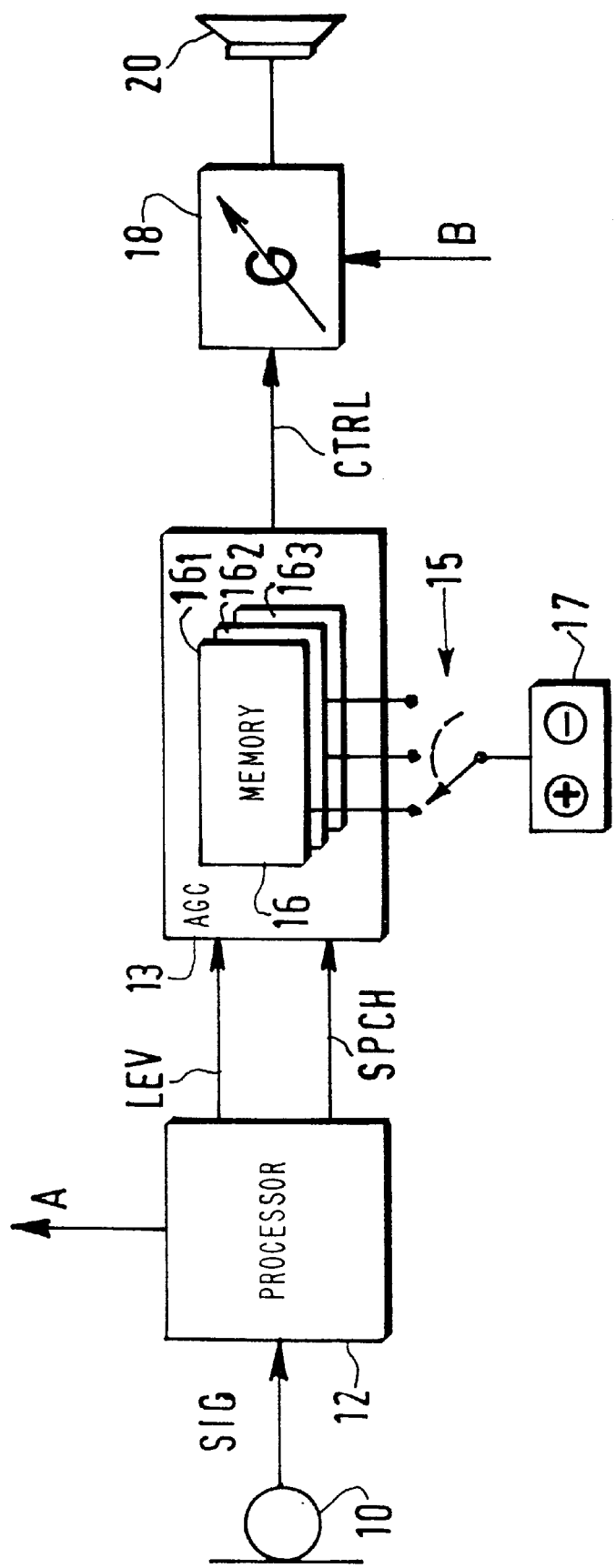
FIG. 1: represents a diagram of a telephone according to the invention comprising input means activated by a user.

FIG. 1 represents a diagram of a telephone according to the invention. It comprises sound detection means represented here by a microphone 10, and sound broadcasting means represented here by a loudspeaker 20. These means may be united in a handset or separated for a hands-free operation. Although they are not shown in FIG. 1, the detection means 10 comprise customary components such as an analog/digital converter (for a digital telephone), filters for limiting the passbands, an amplifier. The microphone produces a signal SIG which enters processing means 12 which are followed by automatic gain control means 13. The signal SIG includes the telephone user's voice and ambient noise. The processing means 12 extract from the signal SIG the voice A of the speaker (user) forming the contents of the signal SIG and also characteristic features of the signal SIG. They are, for example:

a signal LEV, measuring the sound level of the detected signal SIG;

a signal SPCH, featuring the periods at which voice occurs in the signal SIG.

Voice A of the user may be coded in various manners by processing means 12 to be transmitted to a called party.

The two signals LEV and SPCH enter control means 13 which apply a control signal CTRL to amplifier means 18. This control signal acts on the sound level produced by the loudspeaker as a function of the measured ambient noise, that is to say, that it applies a variable gain G to the signal B coming from the called party. According to the invention, the telephone includes input means 17 which make it possible for the user to impose his preferences as regards listening level. Preferably, these input means are formed by an incrementation button "more" and a decrementation button "less". The action of the user is decoded by selection means 15 or by a program for addressing one of the laws stored in the storage means 16, for example, three laws $16_1$, $16_2$, $16_3$.

The operation algorithm is the following. When the signal SPCH is inactive (state 0), that is to say, there is no voice in the signal SIG, the means 13 are activated. They receive the signal LEV which gives the ambient noise level. According to this characteristic features of the selected variation law among those stored in the means 13 and thus depending on the noise level of the signal LEV, the means 13 produce a signal CTRL which defines the gain G to be applied at the respective instant.

Figure 2:
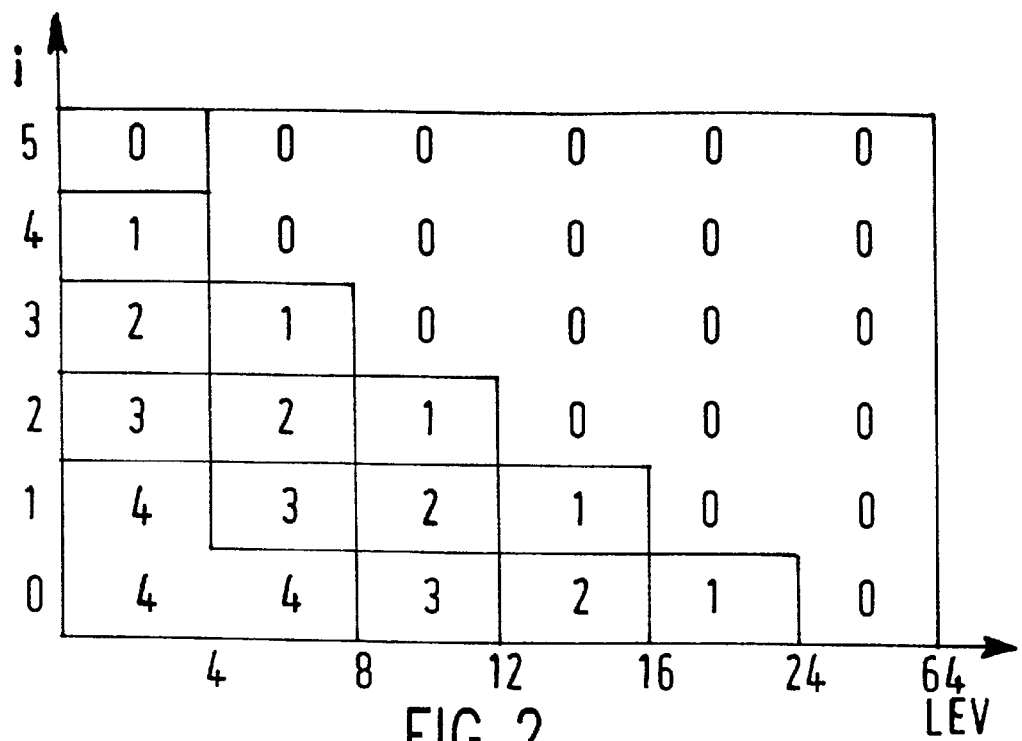
FIG. 2: represents a table of various gain variation laws plotted against ambient noise level.

FIG. 2 indicates six laws which give the amplitude of the signal CTRL as a function of the ambient noise LEV (x-axis). Each law referenced by an index i corresponds to a row of the Figure. The signal LEV is digitized in 64 steps in this example. The control signal CTRL comprises five levels 0, 1, 2, 3, 4 shown in FIG. 2. Value 4 corresponds to the lowest gain of the amplifier and the value 0 corresponds to the highest gain. Thus, when the noise is weak (for example, LEV=4), the applied gain is low (CTRL=4) for the law i=0.

When the voice detection signal is active (SPCH=1), the means 13 are rendered inactive, that is to say, the noise level is not taken into account and the level of the signal CTRL is maintained at its last value. This is due to the fact that in that case the ambient noise level cannot be obtained from the signal LEV.

When a telephone communication is set up, whether it is the habitual user or a new user, the apparatus starts by a "default law", the law having index 0, or a low-index law. Then, when the user pushes the "more" button (FIG. 1), the selection means 15 select the index of the next law (up to $i_{max}$). The index i is replaced by the index i+1 to augment the gain. Similarly, when the user pushes the "less" button, the selection means 15 select the index of the preceding law (up to $i_{min}$). The index i is replaced by the index i+1 to diminish the gain. Thus, the apparatus comprises means for providing that the adaptation law can be chosen by the user as a function of his preferences, the adjustments being made automatically as a function of the ambient noise level.

Figure 4:
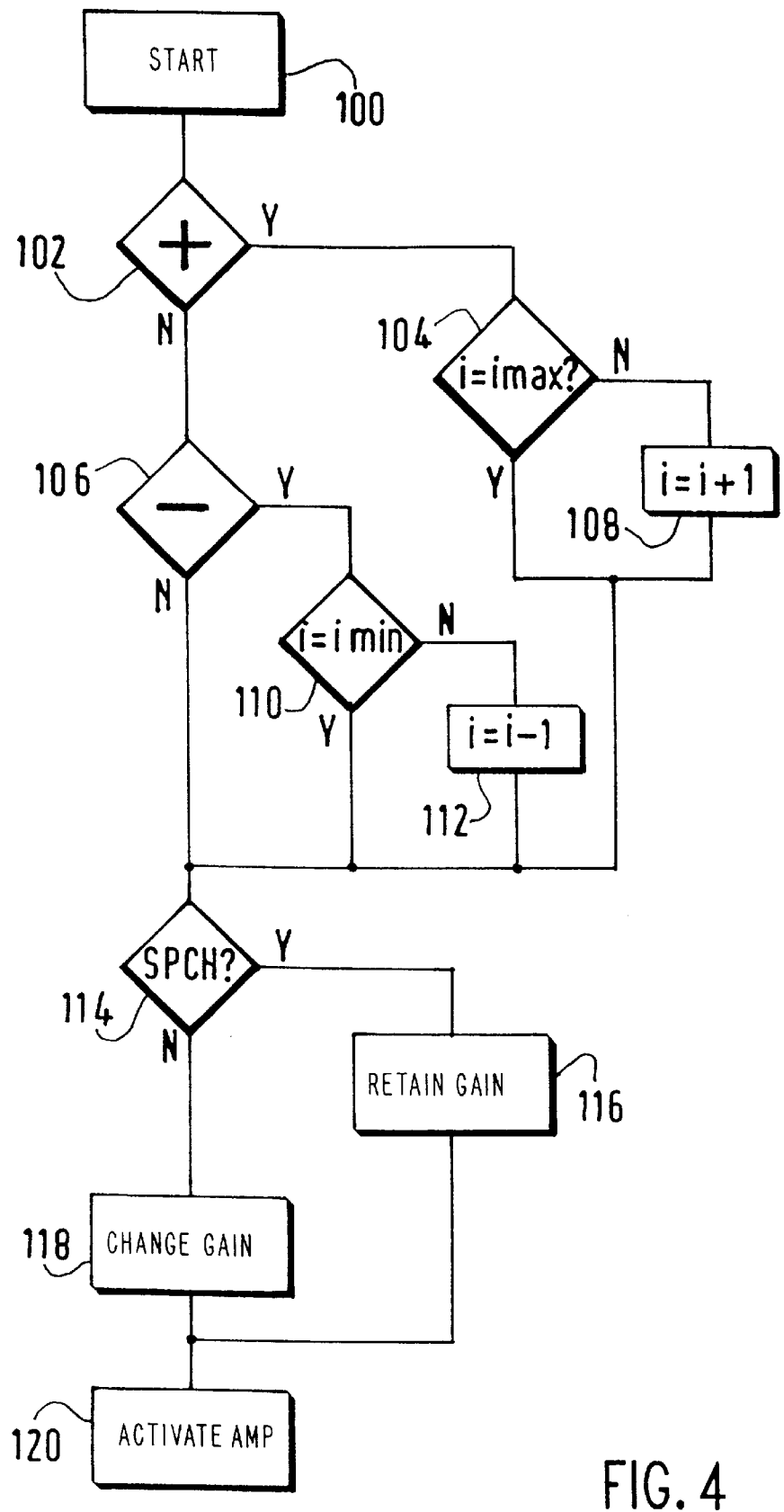
FIG. 4: represents a flow chart showing the various steps for selecting the desired variation law.

FIG. 4 shows the flow chart of the various steps utilized in the invention.

Step 100—Automatic and cyclic start of the volume adjustment program;

step 102—Test for determining whether a request for augmenting the gain has been made since the last time the program was called. If the response is negative, step 106 is proceeded to. If the response is positive, step 104 is proceeded to;

step 104—Test for determining whether the signal CTRL has its maximum value. If the response is positive, step 114 is proceeded to. If the response is negative, step 108 is proceeded to;

step 108—Incrementation of the law having index i=i+1;

step 106—Test for determining whether a request for diminishing the gain has been made since the last call of the program. If the response is negative, step 114 is proceeded to. If the response is positive, step 110 is proceeded to;

step 110—Test for determining whether the signal CTRL has its minimum value. If the response is positive, step 114 is proceeded to. If the response is negative, step 112 is proceeded to;

step 112—Decrementation of the law having index i=i−1;

step 114—Determination whether the voice signal is active SPCH=1. If the response is positive, step 116 is proceeded to;

step 116—The means 13 retain the previously existing adjustments, the signal CTRL remains unchanged;

step 118—If the voice signal has been detected to be inactive in step 114 (SPCH=0), the means 13 are activated to carry out a computation of the control signal CTRL to modify the gain as a result;

step 120—The amplifier means 18 are activated by the signal CTRL.

Figure 3:
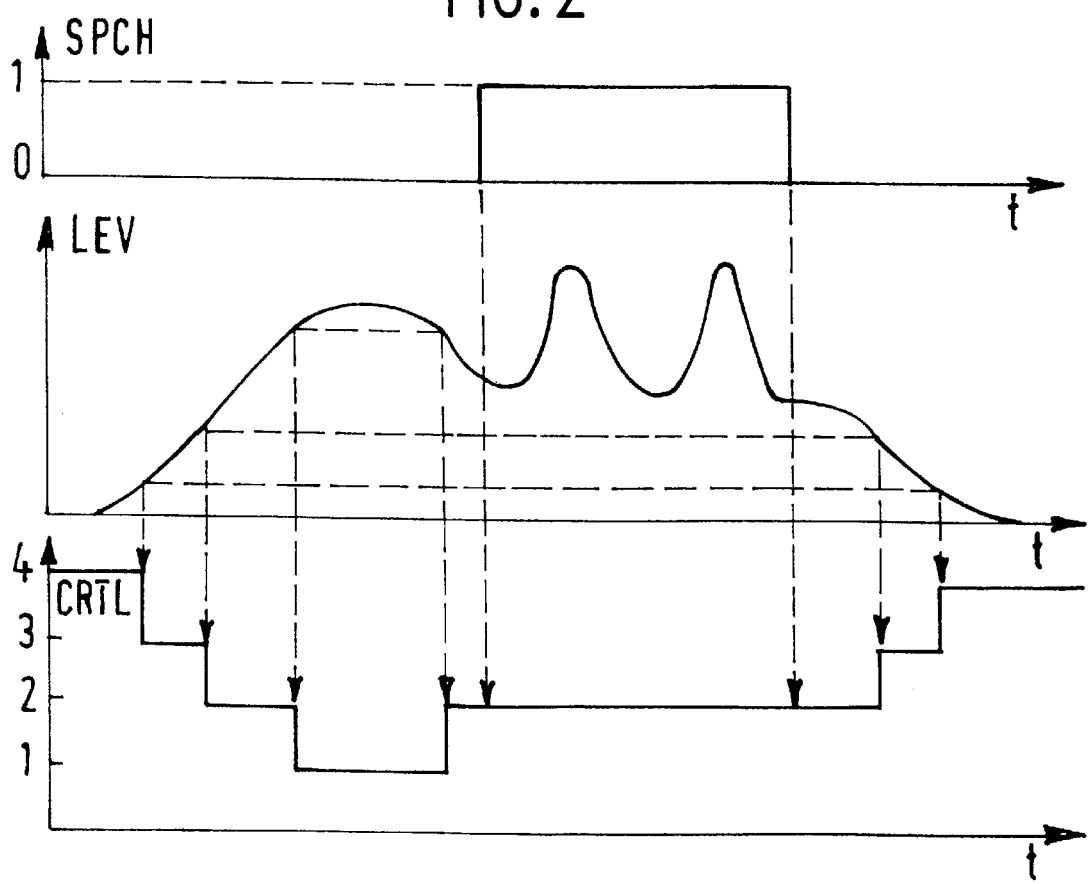
FIG. 3: represents curves showing variations of the level LEV of the microphone signal, the variations of the signal SPCH expressing the presence of the user's voice, the variations of the control signal CTRL which is applied in this case.

FIG. 3 shows a detailed course of the procedure as a function of time of the various actions which appear in the course of various successive calls of the program. It will be observed that when SPCH=0, the signal CTRL varies as was indicated above. When SPCH changes to the 1-state, the signal CTRL retains the value it had just before the appearance of this transition.

The strategies for passing from one variation law to another law may be diverse. Thus, the index i may be augmented or diminished not by one step but by various steps, until the control signal has actually varied. This happens for the low noise levels for which the gain variations are small. Thus, let us consider the situation shown by the laws i=0 and i=1 of FIG. 2. For these laws, when, for example, LEV is less than 4, the signal CTRL continues to have the value 4. Thus, for these noise conditions (LEV=2), starting from the index law i=0, if the user pushes the "more" button, according to that which has just been indicated, the means 13 will activate the law having index i=1. In such cases, to avoid the user having to push the button two or more times to obtain a change of gain, the means 13 may jump to the first law which produces a modification of the signal CTRL. In the situation taken as an example, by pushing the "more" button 17 once, the selected law will thus not be the law having the index i=1, but the law having the index i=2, because the signal CTRL will then have passed from the value 4 to the value 3.

The embodiment that has been described up to now, relates to a telephone formed by a handset which combines the microphone and the loudspeaker. There are hands-free telephones for which the user does not hold the receiver close to his ear. In that case, the loudspeaker 20 distributes the voice of the called party which is captured by the microphone. This voice of the called party is then considered to be ambient noise by the processing means which is the reverse of the sought control. In this situation, it is thus necessary to eliminate the called party's voice before the processing described above is carried out.

Figure 5:
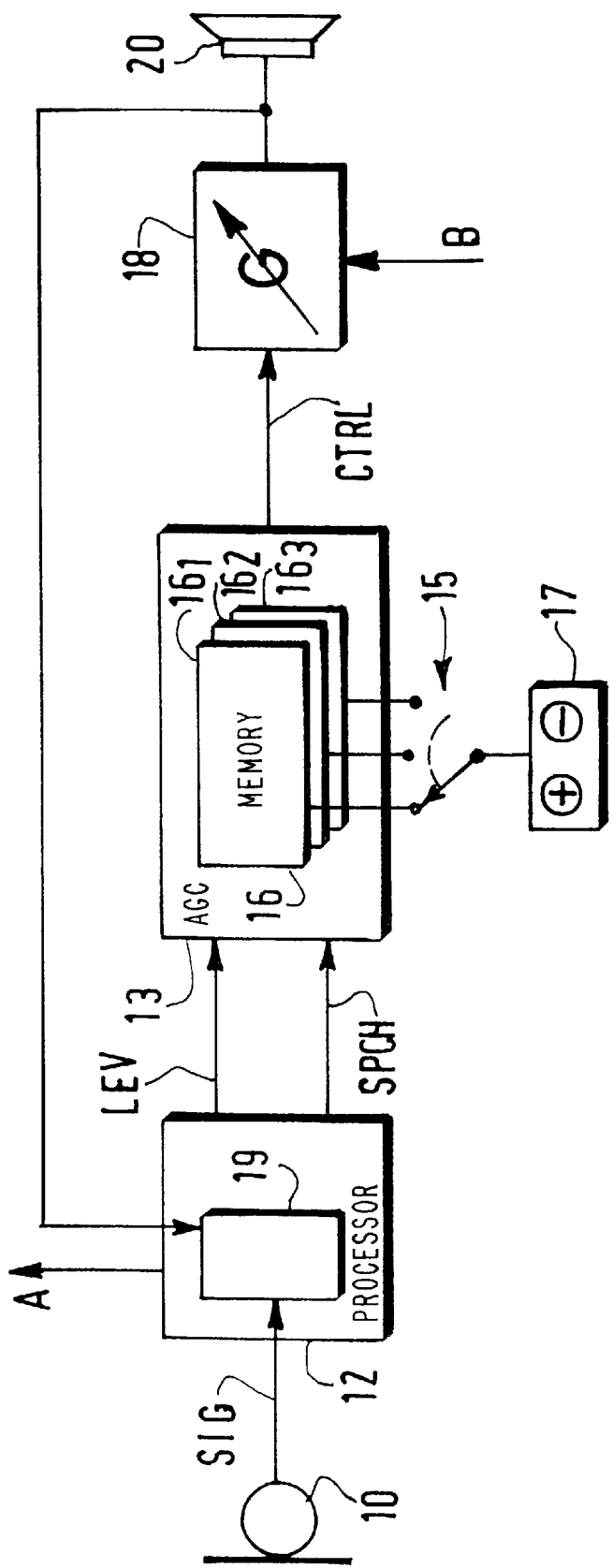
FIG. 5: represents a diagram of a telephone according to the invention including adaptive filter means for a hands-free operation of the telephone.
Figure 6:
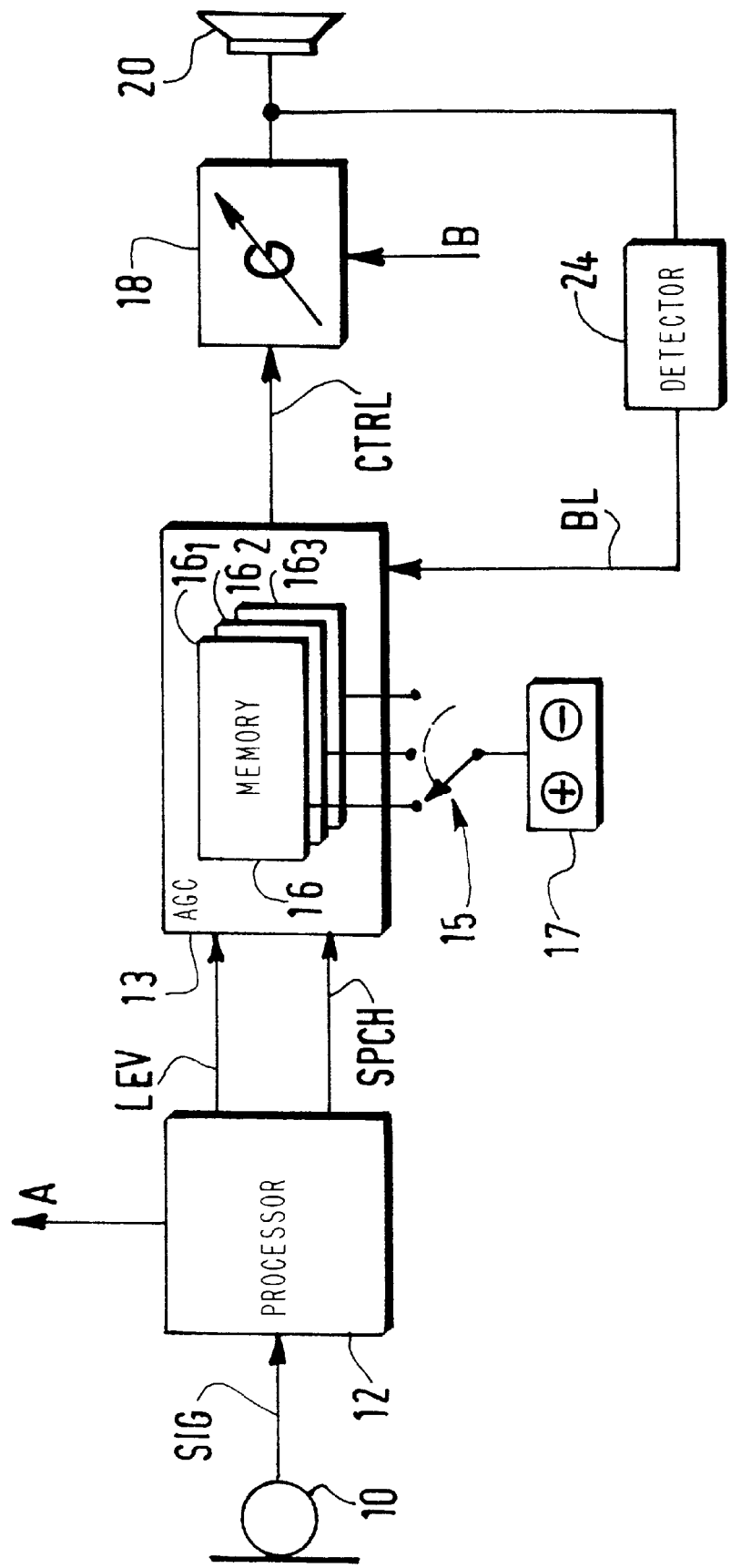
FIG. 6: represents a diagram of a telephone according to the invention including means which carry out a computation of the signal energy for a hands-free operation of the telephone.

The FIGS. 5 and 6 relate to the case where variation laws are selected in the case of a hands-free operation. Like elements are indicated by like references. The situation has been found necessary in the case where the microphone captures the sound signal produced by the loudspeaker, thus the called party's voice, so that the signal SIG does not only include noise when the signal SPCH is zero. To obtain a measurement of only ambient noise, the called party's voice is thus to be eliminated.

FIG. 5 shows by way of example a diagram of a first embodiment for a selection of the laws for hands-free operation. The processing means 12 thus comprise adaptive processing means 19. They receive the signal arriving via the loudspeaker 20 and the signal SIG produced by the microphone 10. By applying a known adaptive filter algorithm, it is thus possible to eliminate the influence of the called party's signal which occurs in the signal captured by the microphone and, consequently, obtain a measurement of only the ambient noise when the signal SPCH is inactive. This algorithm is described, for example in the document "Adaptive Noise Canceling: Principles and applications" by B. Widrow et al. Proceedings of the IEEE vol. 63, No. 12, December 1975, pp. 1692–1716.

FIG. 6 shows by way of example a diagram of a second embodiment of the selection means for selecting variation laws for hands-free operation. In this case, means 24 measure the energy BL of the signal arriving via the loudspeaker 20. The level BL of the signal arriving via the loudspeaker is introduced into the control means 13. When the signal SPCH is inactive (no voice in SIG), the control means 13 eliminate the level BL from the level LEV to obtain a measurement of the ambient noise.

What is claimed is:

1. A telephone comprising:
   a processor which separates a local signal from a user of said telephone into a sound signal and a speech signal;
   an automatic gain control circuit which selects a gain value from sets of gain values stored in a table format in a memory of said telephone based on sound levels of said sound signal when said speech signal indicates an absence of speech from said user, said sets being a function of volume levels selected by said user and said gain values of said sets being a function of said sound signal; and
   a variable gain amplifier having said gain value to amplify a received signal.

2. The telephone of claim 1, further comprising an input device which allows said user to select one of said volume levels.

3. The telephone of claim 1, wherein each one of said sets corresponds to each one of said volume levels, said each one of said sets having gain values which are a function of said sound signal.

4. The telephone of claim 1, wherein a next volume level is bypassed to another volume level if a corresponding gain value of said next volume level equals to a current gain value of a current volume level.

5. The telephone of claim 1, wherein each of said sets corresponds to a different ones of said volume levels.

6. The telephone of claim 1, wherein said sound levels are provided on one axis of said table and said volume levels are provided on another axis of said table.

7. A telephone comprising:
   a microphone which receives a local signal including a speech signal from a user and a noise signal;
   a memory;
   an automatic gain control circuit which selects a gain value from sets of gain values stored in a table format in said memory when said speech signal is absent, said sets being a function of volume levels selected by said user and said gain values of said sets being a function of noise levels of said noise signal; and
   a variable gain amplifier having said gain value to amplify a signal received by said telephone.

8. The telephone of claim 7, further comprising a processor which separates said local signal into said noise signal and said speech signal.

9. The telephone of claim 7, further comprising an input device which allows said user to select one of said volume levels.

10. The telephone of claim 7, wherein each one of said sets corresponds to each one of said volume levels, said each one of said sets having gain values which are a function of said sound signal.

11. The telephone of claim 7, wherein a next volume level is bypassed to another volume level if a corresponding gain value of said next volume level equals to a current gain value of a current volume level.

12. The telephone of claim 7, wherein each of said sets corresponds to a different ones of said volume levels.

13. The telephone of claim 7, wherein said noise levels are provided on one axis of said table and said volume levels are provided on another axis of said table.

* * * * *